United States Patent
Notani et al.

(10) Patent No.: US 6,332,130 B1
(45) Date of Patent: *Dec. 18, 2001

(54) SYSTEM AND PROCESS FOR INTER-DOMAIN PLANNING ANALYSIS AND OPTIMIZATION USING MODEL AGENTS AS PARTIAL REPLICAS OF REMOTE DOMAINS

(75) Inventors: Ranjit N. Notani, Irving; John E. Mayer, Dallas, both of TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,069

(22) Filed: Oct. 4, 1999

Related U.S. Application Data (63) Continuation-in-part of application No. 08/917,151, filed on Aug. 25, 1997, now Pat. No. 5,995,945.

(51) Int. Cl.[7] .................................................. G06F 17/60
(52) U.S. Cl. ..................................... 705/28; 705/1; 705/7; 705/8; 705/10
(58) Field of Search .............................. 705/7, 8, 10, 28; 703/2, 21; 717/1

(56) References Cited

U.S. PATENT DOCUMENTS

| | | | |
|---|---|---|---|
| 5,255,181 | * 10/1993 | Chapman et al. | 705/8 |
| 5,381,332 | * 1/1995 | Wood | 705/8 |
| 5,440,697 | * 8/1995 | Boegel et al. | 703/21 |
| 5,450,317 | * 9/1995 | Lu et al. | 705/10 |
| 5,625,816 | * 4/1997 | Burdick et al. | 707/103 |
| 5,726,979 | 3/1998 | Henderson et al. | 370/254 |
| 5,764,543 | * 6/1998 | Kennedy | 703/2 |
| 5,774,876 | * 6/1998 | Woolley et al. | 705/28 |
| 5,787,283 | * 7/1998 | Chin et al. | 717/1 |
| 5,953,707 | * 9/1999 | Huang et al. | 705/10 |

FOREIGN PATENT DOCUMENTS

| | | |
|---|---|---|
| 0 456 249 A2 | 11/1991 | (EP) . |
| 0 615 198 A1 | 9/1994 | (EP) . |

(List continued on next page.)

OTHER PUBLICATIONS

PEOPLESOFT: Peoplesoft and Red Pepper deliver Supply Chain Collaborator, M2 Presswire, pN/A, May 22, 1997.*
Support of cooperating and distributed business processes. Graw, G.; Gruhn, V.; Krumm, H., Conference Title: Proceedings 1996 International Conference on Parallel and Distributed Systems, pp. 22–31, IEE, Comp. Soc., Press, Los Alamitos, CA., 1996.*

(List continued on next page.)

*Primary Examiner*—Tariq R. Hafiz
*Assistant Examiner*—M. Irshadullah
(74) *Attorney, Agent, or Firm*—Baker Botts L.L.P.

(57) ABSTRACT

A computer implemented system for inter-domain analysis is disclosed. The system includes a domain engine (234), associated with a first supply chain entity, having a local model representing a supply chain activity of the first supply chain entity. The domain engine (234) operable to generate a model agent (240) that represents a partial replica of the local model. The system also includes another domain engine (236), associated with a second supply chain entity, having a local model representing a supply chain activity of the second supply chain entity. The other domain engine is operable to generate a model agent representing a partial replica of the local model. The domain engines (234 and 236) further operate to expand the respective local models using the remote model agents (240) to accomplish local inter-domain analysis. In one embodiment, the model agents (240) can be data model agents, object model agents and behavior model agents.

19 Claims, 7 Drawing Sheets

FOREIGN PATENT DOCUMENTS

| | | | |
|---|---|---|---|
| 0 770 967 A2 | 5/1997 | (EP) . | |
| WO 99/10825 * | 3/1999 | (WO) | G06F/17/60 |
| WO 99/10826 * | 3/1999 | (WO) | G06F/17/60 |
| WO 99/17194 * | 4/1999 | (WO) | G06F/9/46 |
| WO 99/63463 A1 * | 12/1999 | (WO) | G06F/17/60 |
| WO 14998 A2 * | 3/2001 | (WO) | G06F/17/00 |

OTHER PUBLICATIONS

OpenView Mgm't Wares Update. Davis, Beth. Communications Week, v561 p49(2) Jun. 12, 1995.*

Enterprise–wide Management: a paradigm for constructing organizational decision support system. Whitehair, R.C.; Campbell, I.C.; Prabhu, G.M.; Nilakanta, S., IEE, Los Alamitos, CA., Jan. 1993.*

Industrial Dynamics Simulation Models in the Design of Supply Chains. Towill, D.R.; Naim, M.m.; Winker, J., International Journal of Physical Distribution & Logistics Management, v22n5, pp:3–13, 1992.*

A development framework for distributed artificial intelligence. Alder, R.M.; Cottman, B. H., IEE Comp. Soc., Press, Washinton, D.C., 1989.*

PCT International Search Report, Jan. 29, 1999.

PCT International Search Report, Jan. 27, 1999.

XP–002090169, Mihai Barbuceanu, Rune Teigen, Mark S. Fox, "Agent Based Design and Simulation of Supply Chain Systems," 0–8186–7967–0/97, IEEE, 1997.

XP–002090170, Mihai Barbuceanu, Mark S. Fox, "Coordinating Multiple Agents in the Supply Chain," 1080–1383/96, Proceedings of WET ICE '96, IEEE, 1996.

XP–002090171, Fu–Ren Lin, Gek Woo Tan, Michael J. Shaw, "Modeling Supply–Chain Networks by a Multi–Agent System," 1060–3425/98, Proc. 31st Annual Hawaii International Conference on System Science, IEEE, 1998.

XP–002090172, P. Ciancarini, A. Fantini, D. Rossi, "A multi–agent process centered environment integrated with the WWW," 0–8186–7967–0/97, IEEE, 1997.

XP–002090173, Mark S. Fox, John F. Chionglo, Mihai Barbuceanu, "The Integrated Supply Chain Management System", Dec. 7, 1993.

Bernd E. Hirsch, Thorsten Kuhlmann, Zbigniew K. Marciniak, Christian MaBow, "Information system concept for the management of distributed production," 0166–3615/95, 1995 Elsevier Science B.V., pp. 229–241, 1995.

* cited by examiner

SYSTEM AND PROCESS FOR INTER-DOMAIN PLANNING ANALYSIS AND OPTIMIZATION USING MODEL AGENTS AS PARTIAL REPLICAS OF REMOTE DOMAINS

RELATED APPLICATIONS

This application is a continuation-in-part of U.S. patent Ser. No. 08/917,151, filed Aug. 25, 1997, by Ranjit N. Rotani and John E. Mayer and entitled "System and Process for Inter-Domain Planning Analysis and Optimization Using Model Agents as Partial Replicas of Remote Domains, which is now U.S. Pat. No. 5,995,945 issued Nov. 30, 1999."

TECHNICAL FIELD OF THE INVENTION

This invention relates in general to the field of supply chain, enterprise and site planning, and more particularly to a system and process for inter-domain planning analysis and optimization using model agents as partial replicas of remote domains.

BACKGROUND OF THE INVENTION

Supply chain, enterprise and site planning applications and environments are widely used by manufacturing entities for decision support and to help manage operations. Decision support environments for supply chain, enterprise, and site planning have evolved from single-domain, monolithic environments to multi-domain, monolithic environments. Conventional planning software applications are available in a wide range of products offered by various companies. These decision support tools allow entities to more efficiently manage complex manufacturing operations. However, supply chains are generally characterized by multiple, distributed and heterogenous planning environments. Thus, there are limits to the effectiveness of conventional environments when applied to the problem of supply chain planning due to monolithic application architectures. Further, these problems are exacerbated when there is no one "owner" of the entire supply chain.

It is desirable for the next evolutionary step for planning environments to establish a multi-domain, heterogenous architecture that supports products spanning multiple domains, as well as spanning multiple engines and products. The integration of the various planning environments into a seamless solution can enable inter-domain and inter-enterprise supply chain planning. Further, an important function provided by some planning applications is the optimization of the subject environment rather than simply tracking transactions. In particular, the RHYTHM family of products available from I2 TECHNOLOGIES provide optimization functionality. However, with respect to planning at the enterprise or supply chain level, many conventional applications, such as those available from SAP, use enterprise resource planning (ERP) engines and do not provide optimization. It is thus also desirable to expand planning analysis and optimization to the inter-enterprise or inter-domain level to enable planning optimization across the supply chain.

SUMMARY OF THE INVENTION

In accordance with the present invention, a system and process for inter-domain planning analysis and optimization using model agents as partial replicas of remote domains are disclosed that provide advantages over conventional supply chain, enterprise and site planning environments.

According to one aspect of the present invention, a computer implemented system enables inter-domain analysis. The system includes a domain engine, associated with a first supply chain entity, having a local model representing a supply chain activity of the first supply chain entity. The domain engine is operable to generate a model agent that represents a partial replica of the local model. The system also includes another domain engine, associated with a second supply chain entity, having a local model representing a supply chain activity of the second supply chain entity. The other domain engine is operable to generate a model agent representing a partial replica of the local model. The domain engines are further operable to dynamically expand the respective local models using the remote model agents (e.g., as "plug and play" components) to accomplish local inter-domain analysis. In one aspect, the model agents can be data model agents, object model agents and behavior model agents.

According to another aspect of the present invention, a computer implemented process is provided for inter-domain analysis. A first local model is provided that represents a supply chain activity of a first supply chain entity. A model agent is provided that represents a partial replica of a second local model where the second local model represents a supply chain activity of a second supply chain entity. The first local model is dynamically expanded using the model agent to form an inter-domain model. Local inter-domain analysis is then performed using the inter-domain model.

A technical advantage of the present invention is the provision of model agents that allow domains to dynamically expand local models to locally model remote domains. The domains can obtain and incorporate remote model agents which precludes the local domains from having to guess at an appropriate model for the remote domain. Further, the local domain engine does not have to treat the remote domain as a "black box" but can treat the model agent as another extension of its original local model. The expanded local model thereby enables inter-domain and inter-enterprise analysis and optimization. The local models and model agents can be related to various supply chain activities including manufacturing processes, distribution systems, logistics and sales activities.

Another technical advantage of the present invention is that the partial nature of the model agents allows a domain to expose only that portion of its local model that it desires to expose to a particular remote domain.

Additional technical advantages should be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
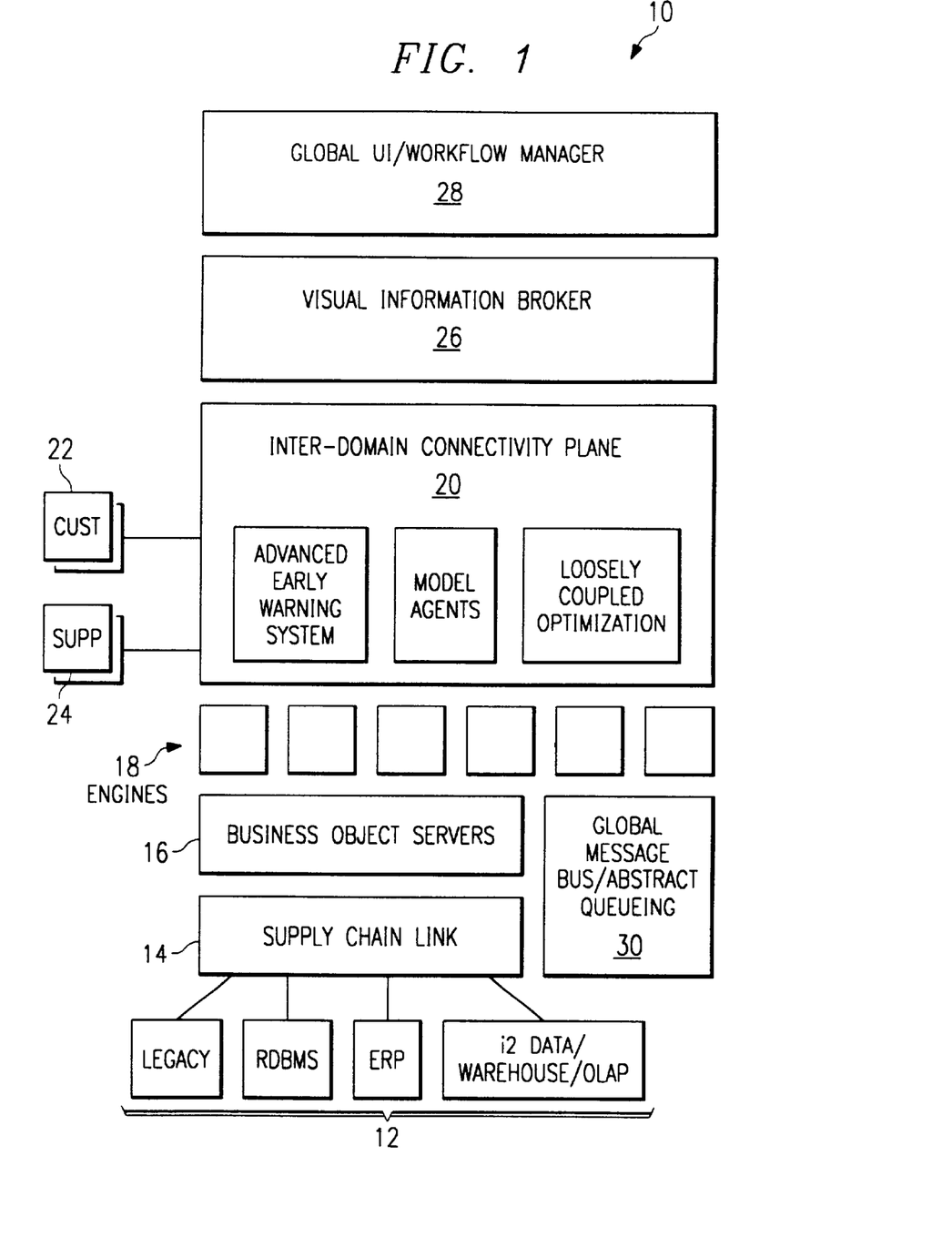
FIG. 1 is a block diagram providing an overview of one embodiment of a core environment that enables supply chain analysis and optimization according to the present invention.

FIG. 1 is a block diagram providing an overview of one embodiment of a core environment, indicated generally at 10, that enables supply chain analysis and optimization according to the present invention. Core environment 10 provides a framework for inter-domain and inter-enterprise analysis and optimization. This framework allows optimization in the extended enterprise distributed environment. The framework also provides an inter-domain decision support environment that allows optimization for the extended enterprise. The framework further allows the embedding of other applications within it and can be embedded within other applications. Core environment 10 integrates multiple engines along multiple dimensions including user interface (UI), messaging, data access, data modeling and other dimensions. Core environment 10 provides scaleability, common protocols and security for supply chain planning and provides a universal adapter framework to provide connectivity between components and with other applications. All of the components and functionality within core environment 10, which are discussed herein, generally can be implemented by software executing on a computer device comprising typical components such as a processor, memory, input/output (I/O) devices and data storage devices.

As shown, core environment 10 includes a number of data sources 12 associated with planning environments that can be used by various enterprises and sites. Data sources 12 include, but are not limited to, legacy data sources (e.g., IBM mainframe and mid-range systems), relational database management systems (RDBMS) (e.g., ORACLE, SYBASE), enterprise resource planning systems (ERP) (e.g., SAP), I2 TECHNOLOGIES data sources, data warehouses and on-line analytical processing (OLAP) sources. Core environment 10 includes a supply chain data link 14 that provides a layer to interface to data sources 12. Supply chain data link 14 can, for example, be a layer established by the RHYTHM-LINK product available from I2 TECHNOLOGIES.

Business object servers (BOS's) 16 work through supply chain link 14 to interface with associated data sources 12. Alternatively, BOS's 16 can interface directly to data sources 12. For each data source 12, BOS's 16 use a dynamically loaded adapter to interface with the particular data source 12 and use a common BOS interface to communicate to higher levels within core environment 10. The structure and operation of BOS's 16 are also shown and described below. As shown in FIG. 1, BOS's 16 can interface to planning engines 18 which comprise various domain engines that handle planning analysis and optimization across the supply chain.

Planning engines 18 are integrated on an inter-domain connectivity plane 20. Inter-domain connectivity plane 20 provides an abstract layer for messaging and transfer of model agents that allow engines 18 to operate at the supply chain level. Inter-domain connectivity plane 20 is specifically geared towards inter-domain decision support, and the structure and operation of inter-domain connectivity plane 20 and its components are also described below. Among the functions provided by inter-domain connectivity plane 20 are messaging between domains, an advanced early warning system between domains for emergency events, the transfer of model agents and the enablement of loosely coupled optimization. Inter-domain connectivity plane 20 also allows interaction with custom applications 22 and support applications 24.

A visual information broker (VIB) 26 interfaces to inter-domain connectivity plane 20 to obtain information from various sources and package that information into a common format. The common format allows global user interface (UI) 28 to use a library of interface components that does not need to be changed every time the information source changes. In one embodiment, user interface components are implemented using JAVABEANS or ACTIVEX user interface components, and the JAVA language is used to provide extensibility. Analogous to BOS's 16, visual information broker 26 uses dynamically loaded adapters specifically designed to interface to particular sources of information. Core environment 10 also includes a global message bus and abstract queuing 30 which enables interaction between engines 18 on inter-domain connectivity plane 20. In one implementation, synchronous communications are handled by common object request broker architecture (CORBA) and distributed component object model (DCOM), and asynchronous communications are handled by supporting many messaging layers, including, but not limited to, TIBCO, MQSERIES, ACTIVEWEB and SMTP (simple mail transfer protocol).

Within core environment 10, global user interface 28 supports a common user interface across multiple engines 18 and data sources 12. Global user interface 28 allows a common set of reusable, data-aware components to be established across the multiple engine types. A number of data-aware user interface components can be supported such as: tree, tree-table, table, two-dimensional and three-dimensional charts (line, bar, Gantt, pie), maps and graphs, multi-dimensional, and axis-cross. Global user interface 28 also can establish a common extensibility mechanism, a common security framework and a common user model.

Core environment 10 can support a number of distinct kinds of user interfaces, including, for example, an ACTIVEX user interface, a JAVABEANS-based stand alone user interface, a JAVABEANS-based browser user interface and a dynamic-SHTML servelet user interface. The ACTIVEX user interface can be supported via a COM interface to a data manager, which can be a sub-component of visual information broker (VIB) 26. Also, data aware ACTIVEX components that are aware of VIB 26 data models can be provided. This user interface would also support JAVABEANS components wrappered as ACTIVEX. The JAVABEANS-based stand alone user interface can include JAVABEANS that are aware of VIB 26 data models. This user interface would support ACTIVEX components wrappered as JAVA components using the MICROSOFT JAVA virtual machine. The JAVABEANS-based browser user interface can be a pure JAVA user interface. It can be designed to run in any browser as well as on network computers. As a pure JAVA interface, the user interface will run inside any JAVA virtual machine (JVM). The dynamic-SHTML servelet user interface can be designed for low-bandwidth situations such as those found on the Internet. This approach distributes the processing at the server side producing dynamic HTML pages that are displayed on a web browser.

In general, core environment 10 is designed to integrate existing and future planning engines at multiple levels and possesses a number of key attributes. Core environment 10 is designed to be open and establish protocols by which applications can be developed to operate under core environment 10. Core environment 10 is component based and uses standard component architectures. For example, CORBA and DCOM can be used as a distributed component architecture, and JAVABEANS and ACTIVEX can be used as user interface component architecture. By having a component architecture, core environment 10 allows changes to be released in pieces and not all at once, allows users to select and use only components that are useful, allows components to be re-used, and allows third party components to be incorporated.

Core environment 10 can be scaleable in a variety of different ways. Components can be load balanced and multi-threaded which leads to higher throughput. As described below, the universal adaptor framework avoids the many-to-many issue which leads to greater scaleability. Further, security is handled by core environment 10 so that individual engines do not have to be worried about security. This also leads to greater scaleability.

With respect to security, core environment 10 can provide a number of forms of security. For example, there can be security between user interface 28 and visual information broker 26 and messaging security. In both cases, both encryption as well as user authentication can be provided. An important aspect is that core environment 10 can implement security in such a way that it does not require each and every engine to be concerned with about security.

Core environment 10 may, however, place some minimal requirements on the engine architecture. In one implementation, core environment 10 makes the assumption that an interface can be provided to the engine that is either an external interface or an in-memory JAVA interface. In this implementation, if an external interface is provided, the interface can be a CORBA interface, a COM/DCOM interface, a shared library, structured query language (SQL), an object database interface or a socket interface. If an in-memory JAVA interface is provided, the interface can typically be accomplished by embedding a JAVA virtual machine (JVM) in the engine and writing a local JAVA interface (LJI) that calls the local native interface (LNI) via the JAVA native interface (JNI). Another assumption that can be made about the engines is that the engines have an ability to be a CORBA client and have the ability to marshall CORBA structures. Native components can be provided for both of these tasks. However, in this case, core environment 10 specifically does not make the requirement that an engine must be a CORBA server (which would require hooking up the engine's event loop with the CORBA event loop).

Universal Adapter Framework

Figure 2A:
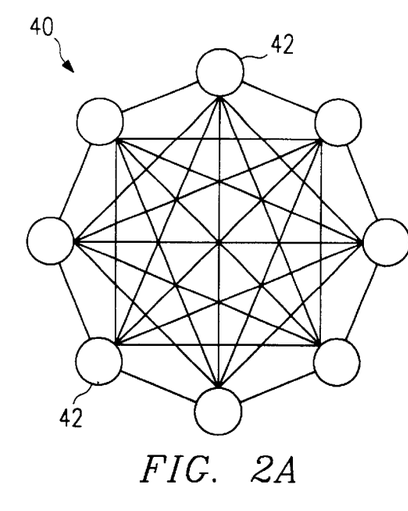
FIGS. 2A and 2B are block diagrams illustrating conventional many-to-many conversion for inter-domain analysis and one-to-many conversion for inter-domain analysis according to the present invention.

One problem in creating core environment 10 is matching an interface (along some dimension) of one product or application with that of another. One possible solution is to write converters between all possible combinations of interfaces. However this leads to a classic many-to-many problem where the number of converters is unmanageable. FIG. 2A is a block diagram illustrating this conventional many-to-many conversion problem for inter-domain analysis. As shown, an environment 40 may contain a plurality of products, applications, data sources or other entities 42 that need to interface with one another. In environment 40, there is a converter, represented by the lines, associated with the interface between each pair of entities 42. As can be seen, this many-to-many solution will generate a requirement to create and manage a prohibitively large number of converters as the number of entities 42 increase.

Figure 2B:
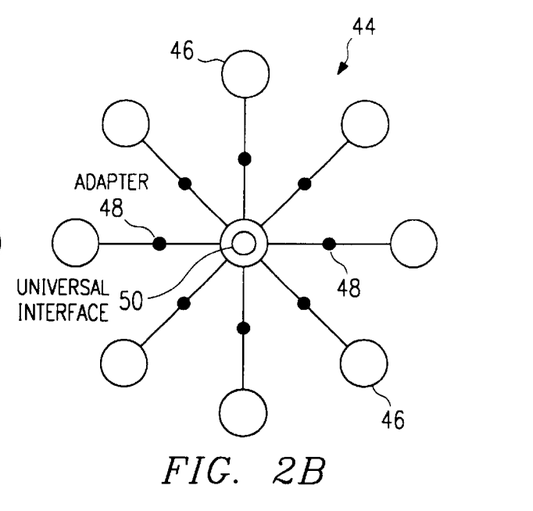

FIG. 2B is a block diagram illustrating one-to-many conversion for inter-domain analysis according to the present invention. This solution is enabled by a universal adaptor framework in which the different adaptation dimensions use the same mechanism for adaptation. As shown, an environment 44 can contain a plurality of products, applications, data sources or other entities 46. However, unlike environment 40 of FIG. 2A, environment 44 further includes a universal interface 50. With this scheme, only one adapter 48 needs to be created and managed between each entity 46 and universal interface 50. In general, an adaptor 48 maps a proprietary interface from an entity 46 into universal interface 50. This allows a one-to-many conversion instead of the many-to-many conversion of FIG. 2A. Further, adapters 48 can be dynamically loadable such that an appropriate adapter 48 can be loaded when an interface to a particular entity 46 is needed and then removed if no longer needed.

This universal adaptor framework works across multiple dimensions using dynamically loaded adaptors 48. These adaptation dimensions can include visual (handled by VIB), data (handled by BOS's), messaging and queuing.

Dynamically loaded adapters 48 help to establish openness within core environment 10 and can use the same mechanism across all adaptation dimensions. This reduces the learning curve for users and developers within core environment 10.

Adaptation Dimensions

Figure 3:
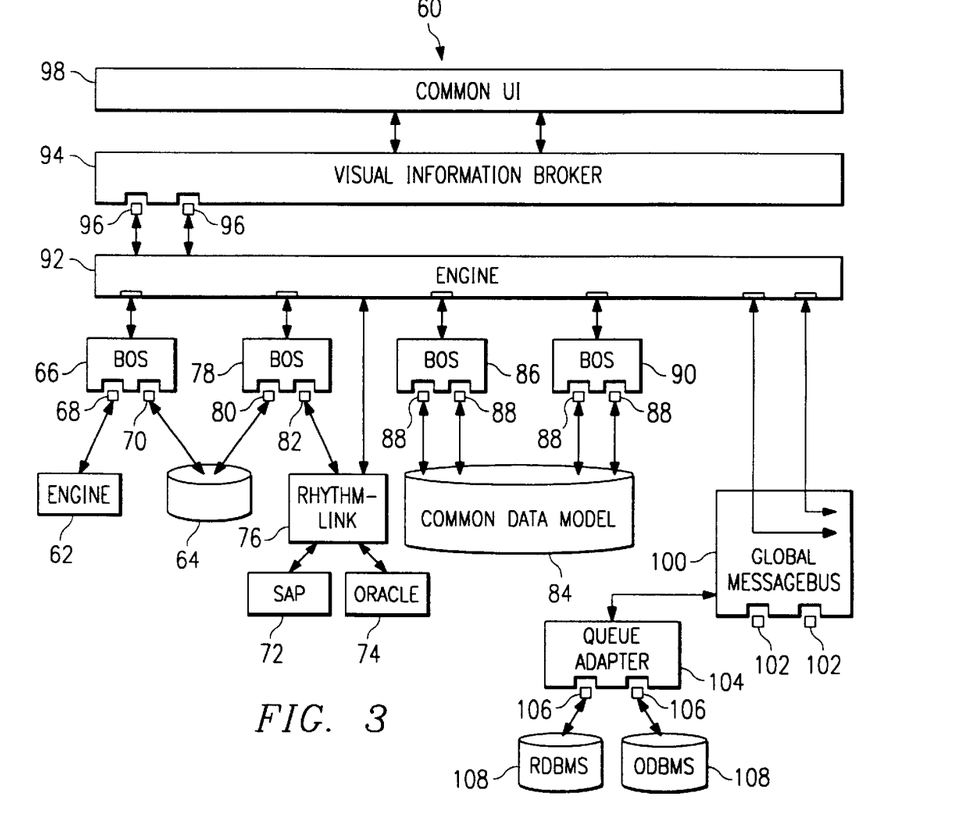
FIG. 3 is a block diagram of one embodiment of relationships among adaptation dimensions associated with inter-domain analysis and optimization according to the present invention.

FIG. 3 is a block diagram of one embodiment of relationships among adaptation dimensions associated with inter-domain analysis and optimization according to the present invention. FIG. 3 shows an example environment, indicated generally at 60, that includes four adaptation dimensions—user interface, data, queuing and message bus—all of which involve dynamically loaded adapters.

Beginning with data sources, environment 60 includes a planning engine 62 and data storage 64 accessed by a business object server (BOS) 66 using dynamically loadable adapters 68 and 70. An SAP based system 72 and an ORACLE based system 74 are linked through a RHYTHM-LINK application 76. A second BOS 78 then accesses both data storage 64 and RHYTHM-LINK application 76 using adapters 80 and 82. Similarly, a common data model storage 84 is accessed by a BOS 86 and a BOS 90 using an adapters 88. BOS's 66, 78, 86 and 90 all interface to a domain engine 92, which can be one of a number of domain engines operating within a supply chain. In addition, RHYTHM-LINK application 76 can be enabled to interface directly to domain engine 92, and in particular can do so when domain engine 92 is an I2 TECHNOLOGIES' product. Domain engine 92, in turn, provides information to a visual information broker 94 through dynamically loadable adapters 96. Visual information broker then provides data to a common user interface (UI) 98 for providing a display to a user. Environment 60 also includes a global message bus 100 which uses adapters 102 to interface to native messaging functionality and allow engine 92 to interact with other domain engines. Global message bus 100 also interfaces with a queue adapter 104 that uses adapters 106 to allow messages to be persisted on either a relational database management system (RDBMS) 108 or an object oriented database management system (ODBMS) 108. This persistence can form the basis for guaranteed message delivery.

The user interface adaptation dimension concerns the presentation of information to users and involves common user interface 98, visual information broker 94 and adapters 96. For example, if an engine 92 needs to be accessible from common user interface 98, then the engine 92 should have visual information broker (VIB) adaptors 96 created for it. Likewise, although not shown, if an application needs to embed an engine 92 into the application's user interface, then the application's user interface can make a call to visual information broker 94 which, in turn, interfaces to engine 92.

The data adaptation dimension concerns the accessibility of data to an engine 92 and involves BOS's 66, 78, 86 and 90 and BOS adapters 68, 70, 80, 82 and 88. If an application or data source needs to be accessible from engine 92, then there should be business object server (BOS) adaptor created for the application or data source.

The queue adaptation dimension concerns queues for transactions and is not directly illustrated in FIG. 3. Queue adaptors, for example, allow queues to be built on transactional databases, including relational database management systems (RDBMS's), such as ORACLE and SYBASE, and object data base management systems (ODBMS's). Queue adapters can be built to any transactional database a main application or engine is using. The queue adaptation layer is also shown and described below.

The message bus adaptation layer concerns communication over message layers and involves global message bus 100 and adapters 102. For example, if an application needs to have communication to an engine 92 implemented over the application's native message layer, then an adaptor 102 can be created to that native message layer.

Visual Information Broker

Figure 4:
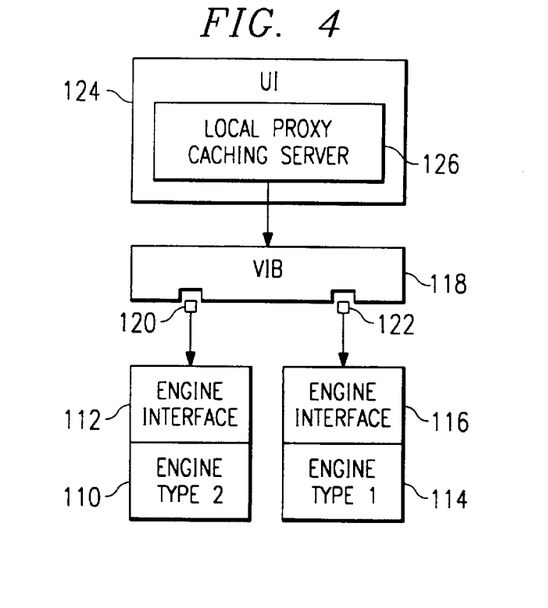
FIG. 4 is a block diagram of the visual information broker (VIB) operating as a middle tier to various engines and other data sources according to the present invention.

FIG. 4 is a block diagram of the visual information broker (VIE) operating as a middle tier to various engines and other data sources according to the present invention. As shown, a first engine 110 (of type 2) has an engine interface 112, and a second engine 114 (of type 1) has an engine interface 116. The visual information broker (VIE) 118 accesses engine interface 112 using an adapter 120 and accesses engine interface 116 using an adapter 122. Visual information broker 118 can then provide information to a user interface 124 which can include a local caching proxy server 126.

VIB 118 then has a common interface which can be accessed by user interface 124 regardless of the type of engine from which VIB 118 obtains information. As mentioned above, user interface 124 can thus include a library of data-aware components such as ACTIVEX and JAVA-BEANS components. VIB 118 can route incoming requests from user interface 124 to engines 110 and 114 which are of different types. VIB 118 can also load-balance engines of the same type. Such a data manager sub-component of VIB 118 is a part of the universal adaptor framework described above. VIB 118 and adapters 120 and 122 allow user interface-oriented data models from multiple engines 110 and 114 to be adapted into a common data model oriented for user interface 124. This forms a basis for common user interface 124.

VIB 118 can provide an interface across multiple sources including databases, in-memory engines, CORBA servers, flat-files, messaging, object databases, etc. VIB 118 uses dynamically loadable adapters as appropriate to interface with the sources. The adapters can be specifically designed to connect to desired source and to VIB 118. This scheme allows support of a wide variety of data models, including tables, trees, name-value pairs, multi-dimensional, and object graphs.

Figure 5:
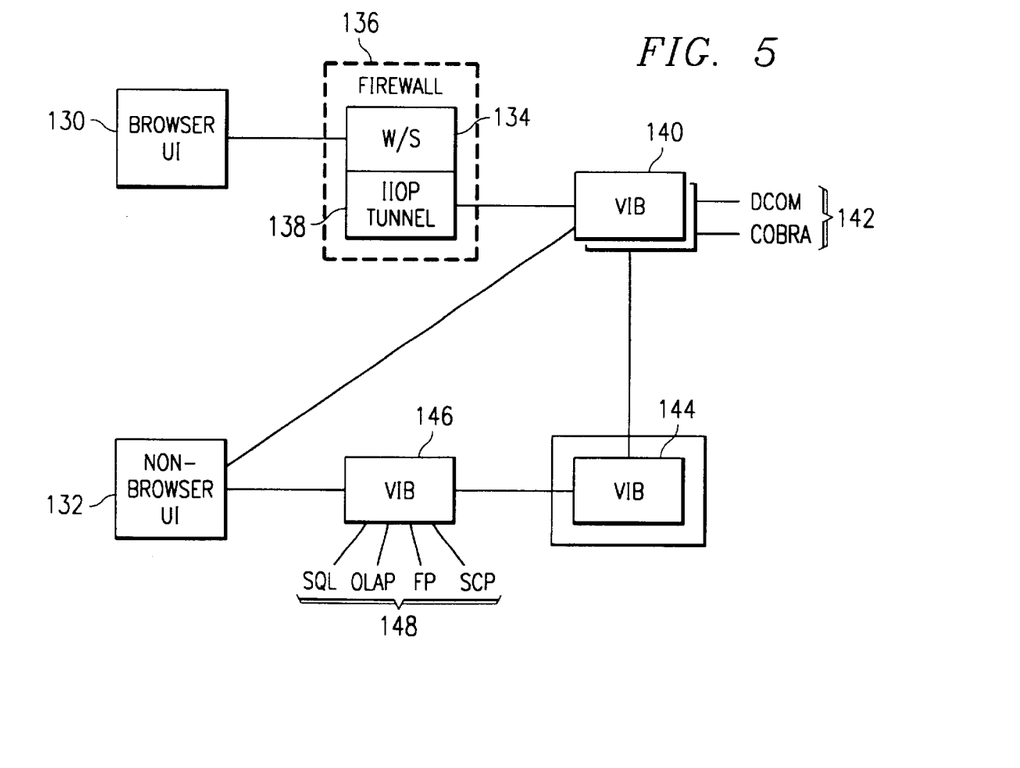
FIG. 5 is a block diagram showing the VIB interaction with various data sources as well as browser and non-browser user interfaces according to the present invention.

FIG. 5 is a block diagram showing interaction between the visual information broker and various data sources as well as browser and non-browser user interfaces according to the present invention. As shown, the environment can include a browser user interface 130 and a non-browser user interface 132. Browser user interface 130 connects through a workstation 134 that provides a firewall 136 and an IIOP tunnel 138.

A visual information broker (VIB) 140 can provide access to information sources 142 (DCOM, CORBA) for both IIOP tunnel 138 and non-browser user interface 132. VIB 140 can also interface with a VIB 144. Another VIB 146 can provide access to information sources 148 (SQL, OLAP, I2-FP, I2-SCP) for non-browser user interface 132. As with VIB 140, VIB 146 can also interface with VIB 144. VIB's 140, 144 and 146 can be designed to access multiple data sources simultaneously, and the data sources can include: CORBA servers, DCOM servers, COM objects, RDBMS data, ODBMS objects and in-memory objects. Further, VIB's 140, 144 and 146 can be load-balanced to divide the load across multiple servers or other sources of information, and this load-balancing can be transparent to user interface 130 or 132.

Visual information brokers can support a multi-threaded environment with a thread-pool model where individual requests can be executed in their own thread until a certain maximum number after which they can be queued. Visual information brokers also can be directly embedded in an engine and can run on the same machine as the engine for high-throughput compared to network access.

In one embodiment, visual information brokers include data manager, event channel and page manager sub-components. The data manager sub-component can be accessible via CORBA as well as COM and supports multiple data models including: tree-table, name-value list, axis-cross, multi-dimensional and object graph. The data manager can also support client-originated execution of model agents. The event channel sub-component allows the common user interface to subscribe to and be notified of server events. The page manager sub-component can allow a user interface to be created in an SHTML format. This format allows inter-leaving of static HTML with dynamic servelets. It is more efficient than CGI since it does not require a separate process spawned per request, but only a separate thread per request (up to a maximum since it uses a thread-pool model). The page manager also can be compatible with the JAVASOFT servelet application program interface (API). It can load in standard servelet components as well as application-specific servelets. The page manager can be similar to a JAVASOFT JAVASERVER with a number of additional features and differences. The page manager can be instantiated stand-alone or within another process. In process instantiation allows a very tight coupling between the servelet and the process. The page manager can be load-balanced and is designed to work with a web server and not be a replacement for one. The page manager also links servelet parameterization with page parameterization so that dynamic servelets can form direct parameterized links to SHTML pages.

Business Object Servers

Figure 6:
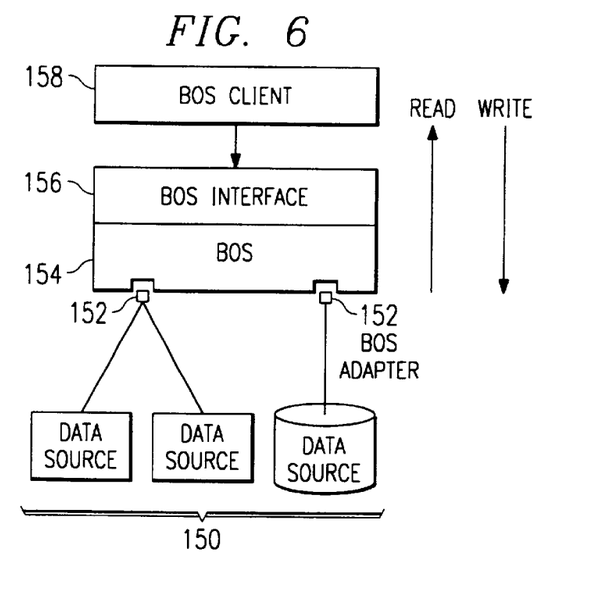
FIG. 6 is a block diagram of a business object server operating as data server according to the present invention.

FIG. 6 is a block diagram of a business object server (BOS) operating as a data server according to the present invention. A number of data sources 150 have associated dynamically loadable BOS adapter's 152 that interface between data sources 150 and a business object server (BOS) 154. Business object server 154 includes a BOS interface 156 which can be standard across business object servers. A BOS client 158 can then interface with business object server 154 through BOS interface 156. As shown, BOS client 158 can read from and write to data sources 150 through business object server 154, and business object server 154 can handle the specific interface with data source 150 via an appropriate BOS adapter 152. The dynamically loadable nature of BOS adapters 152 mean that they can be loaded as needed and then removed without having to otherwise affect the operation of business object server 154.

In general, BOS client 158 can be a planning engine, and business object server 154 can serve up objects to the engine from multiple different data sources 150. In this manner, business object servers 154 form an integral part of the described universal adaptor framework. BOS adapters 152 adapt data from the multiple data sources 150 into specific business objects. Each business object server can thus be classified by the data source interfaces to which it adapts.

BOS adapters 152 to data sources 150 can have a common model and an other model format. For the common model format, a standard BOS interface 156 and standard BOS adaptors 152 can be fused into a single object. Effectively, in this case, BOS adaptors 152 then provide only an object-relational mapping. For non-standard BOS adapters 152, an application can be provided to allow development of special business object servers 154 as well as BOS adaptors 152. For the other model format, there can be BOS adaptors 152 to many non-standard data sources 150, including enterprise resource planning (ERP) systems and other planning systems. BOS adaptors 152 can operate to make accessible proprietary non-standard data sources 150. For the other model format, an application can, again, be provided to allow development of special business object servers 154 and BOS adaptors 152.

Queuing and Messaging

Figure 7:
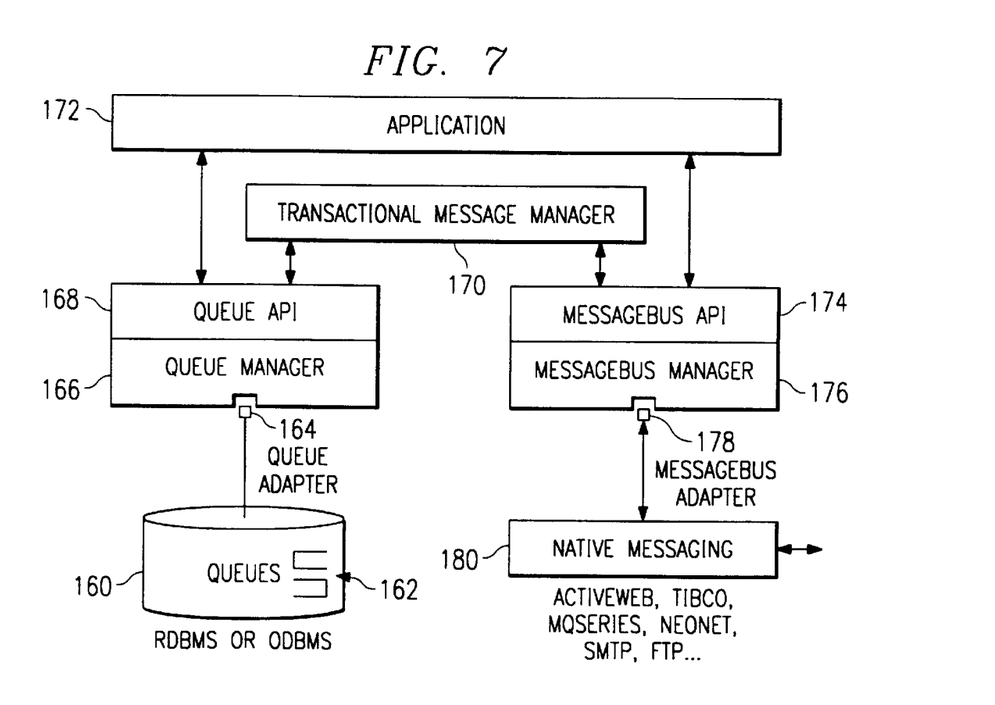
FIG. 7 is a block diagram showing different components of queuing and the global messaging bus according to the present invention.

FIG. 7 is a block diagram showing different components of queuing and the global messaging bus according to the present invention. The queuing and global messaging are also built upon the described universal adaptor framework. With respect to queuing, a storage 160 can contain queues 162 that include transactions for a relational or object database management system (RDBMS, ODBMS). A dynamically loadable queue adapter 164 provides an interface from a queue manager 166 to queues 162. Queue manager 166 includes a queue application program interface (API) 168 that can be standard across queue managers 166. A transactional message manager (TMM) 170 and an application 172 can interface to queue manager 166 via queue API 168.

Similarly, with respect to global messaging, transactional message manager (TMM) 170 and application 172 can interface through a message bus API 174 to a message bus manager 176. Message bus manager 176, in turn, can use a dynamically loadable message bus adapter 178 to interface to native messaging 180 of the underlaying native applications. This allows global messaging to be built on top of any third party messaging solutions including, for example, ACTIVEWEB, TIBCO, MQSERIES, NEONET, SMTP and FTP. This also allows applications 172 to be abstracted from the underlying native message layer 180. In one embodiment, three levels of messaging are provided having different characteristics: fast/reliable messaging; certified messaging; and guaranteed/transactional messaging. The fast/reliable messaging can provide a reasonable efforts attempt to deliver the messages. The certified messaging can provide certifications of message delivery to the client application. Third, guaranteed/transactional messaging can be provided between queues on transactional databases to ensure delivery of messages, including messaging between different transactional databases (e.g., between ORACLE and SYBASE databases or between RDBMS and ODBMS databases).

Figure 8:
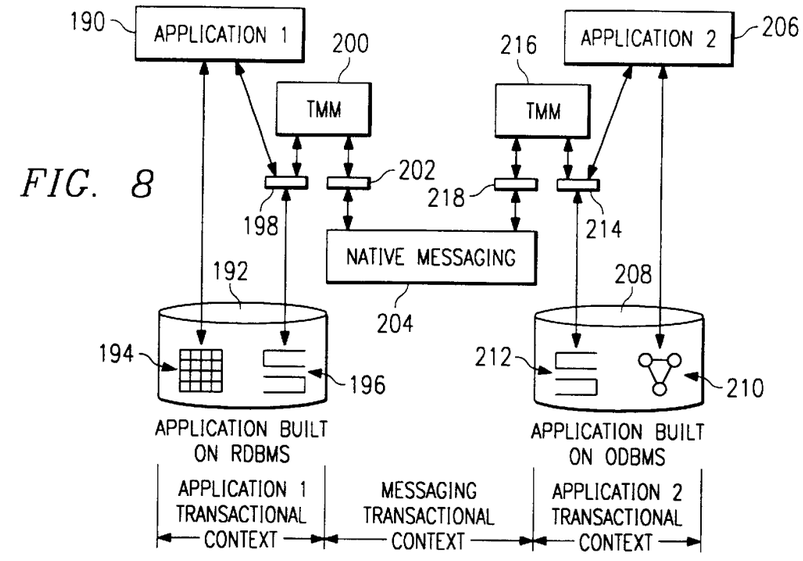
FIG. 8 is a block diagram showing transactional messaging between applications according to the present invention.

FIG. 8 is a block diagram showing transactional queuing and messaging between applications according to the present invention. As shown, a first application 190 has a transactional context that can include a storage 192 holding relational database information 194 and transactional queues 196. A queue manager 198 provides an interface to queues 198 for application 190 as well as a transactional message manager (TMM) 200. Within a messaging transactional context, a message bus manager 202 provides an interface between transactional message manager 200 and native messaging layer 204.

Similarly a second application 206 has a transactional context that can include a storage 208 holding object database information 210 and transactional queues 212. A queue manager 214 provides an interface to queues 212 for application 206 as well as a transactional message manager (TMM) 216. Within the messaging transactional context, a message bus manager 218 provides an interface between transactional message manager 216 and native messaging layer 204.

This framework allows an abstract queuing and global messaging layer between applications 190 and 206 to be supported on an underlying native messaging layer 204. Within this messaging framework, point-to-point messaging with global addressing, publish and subscribe messaging and efficient encrypted, user-authenticated messaging can be supported. Further, an out-of-the-box solution consisting of message bus adaptors to ACTIVEWEB or TIBCO, and queue adaptors on top of an ODBC compliant database can be provided. These adaptors can be bundled along with the messaging solution (ACTIVEWEB or TIBCO) to create the out-of-the-box messaging solution.

Model Agents

The core environment is an inter-domain architecture that allows, for example, inter-enterprise optimization. Aspects of the environment that address a need for an inter-domain solution include: a security framework (both user interface to engine and messaging), messaging that is global in scope (including a global naming scheme, and transactional messaging to allow multiple transactional domains to be kept transactionally consistent). Further, inter-domain analysis and optimization are enabled by allowing domains to exchange model agents that comprise partial replicas of the remote domains.

Figure 9A:
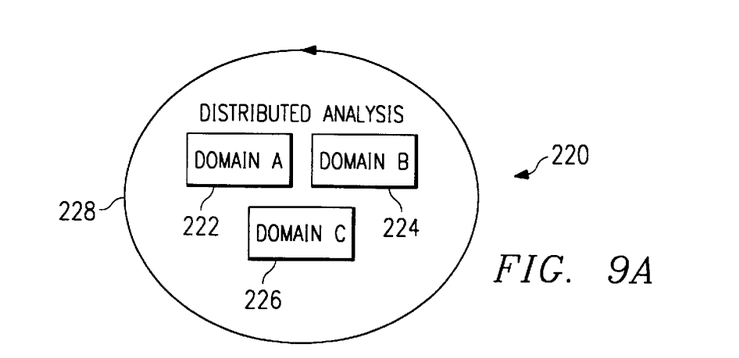
FIGS. 9A and 9B are block diagrams of a naive approach to inter-domain analysis and optimization and of the use of model agents as partial replicas according to the present invention.

FIG. 9A is a block diagram of a naive approach to inter-domain analysis. As shown, an environment 220 can include a plurality of domains 222, 224 and 226 (domains A, B and C). The naive approach is characterized by a distributed analysis, represented by arrow 228, in which distributed algorithms are run directly across the multiple domains 222, 224 and 226. This approach has some severe drawbacks. For example, reliability falls of dramatically as the number of domains increases. Also, in this approach, permissibility (i.e., one domain allowing access by another domain to its model) and security need to be intrinsically bound up with the distributed analysis. This places a heavy burden on the analysis algorithm and would function too slowly but for the simplest of analysis algorithms. Another alternative, not shown, is to have every domain 222, 224 and 226 independently model all of the other domains 222, 224 and 226. This approach, however, suffers from the difficulty of accurately knowing the model and data for other domains 222, 224 and 226. This approach also suffers from a scaleability problem with going to large numbers of domains 222, 224 and 226.

Figure 9B:
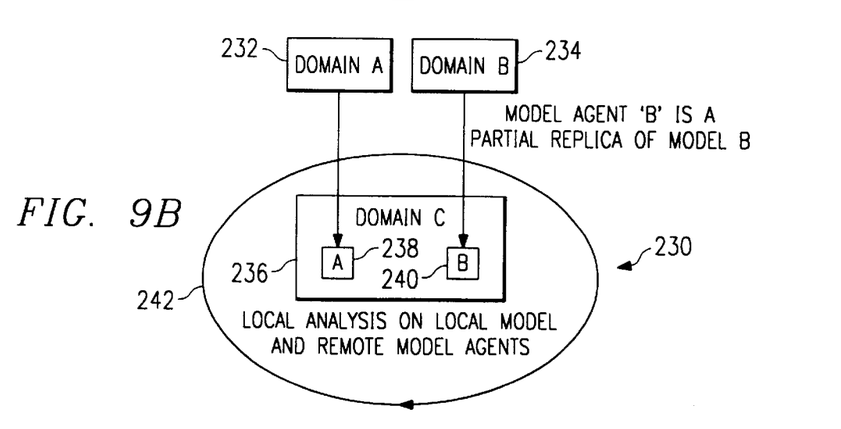

FIG. 9B is a block diagram of the use of model agents as partial replicas of remote domains according to the present invention. The model agents provide an alternative mechanism that makes feasible inter-domain analysis and optimization. As shown, an environment 230 can include a plurality of domains 232, 234 and 236 (domains A, B and C). These domains 232, 234 and 236 each have models that are used for local planning analysis and optimization. According to the present invention, domains 232, 234 and 236 transfer model agents to each other that are partial replicas of the respective domains' model. The transfer of these model agents is preferably via a push scheme to subscribing domains, but may involve pull schemes or other transfer schemes. For example, domain 232 (domain A) provides a model agent 238 to domain 236 (domain C) that is a partial replica of the model for domain 232. Model agent 238 comprises that portion of the model for domain 232 that is needed by domain 236 and to which domain 232 desires to grant external access. Similarly, domain 234 (domain B) can provide a model agent 240 to domain 236 (domain C) that is a partial replica of the model for domain 234. Again, model agent 240 comprises that portion of the model for domain 234 that is needed by domain 236 and to which domain 234 desires to grant external access. As a result, instead of running a distributed analysis over multiple domains, model agents 238 and 240 allow a local analysis, as represented by arrow 242, to be run on domain 236 using a combination of the local model (for domain C) and portions of the remote models (for domains A and B) as represented by model agents 238 and 240.

As should be understood, the use of model agents as partial replicas of remote domains allows each interested domain to accomplish inter-domain analysis and optimization via local processes. Additionally, mechanisms can be provided to continually replenish the model agents from remote domains by pushing the model agents to all subscribing domains, or otherwise providing updates to other domains. The model agents are thus partial replicas of models that can be passed around networks as discrete packages. It should be understood that the "partial" aspect can be important since typically a domain would wish to send another domain only portion of its complete model rather than the whole thing.

In one embodiment, there are three levels of model gents, each with increasing degrees of sophistication. the first level is data model agents. These are the simplest of the three and are used to pass around pure data. The second level of model agents are object model agents. These model agents allow entire graphs of objects to be passed around. Allowing graphs of objects to be passed around enables sophisticated forms of collaboration that would be difficult to achieve only with data model agents. For example, using object model agents, one domain can send to another domain a partial picture of its supply chain model. The third level of model agents are behavior model agents. These model agents are more sophisticated and allow entirely new behaviors to be passed from one domain to another. For example, one domain could send to another domain a new pricing policy or inventory policy as a behavior model agent.

The model agents of the present invention solve both the infeasibility and scaleability problems of other inter-domain approaches. The model agents allow a needed portion of a remote domain to reside locally and be used for analysis and optimization. The model agents are generally extracted by each domain and provided to other subscribing domains. A subscribing domain can obtain remote model agents preferably by having the model agents pushed to the domain, although other forms of subscription are possible. The model agents broadly enable inter-domain and inter-enterprise analysis and optimization and can embody key features of permissibility (only allowed portions are sent), pushed subscription (each domain pushes changes if they occur), and hybrid composition (both state and behavior are transferred).

Inter-domain Connectivity Plane

Figure 10A:
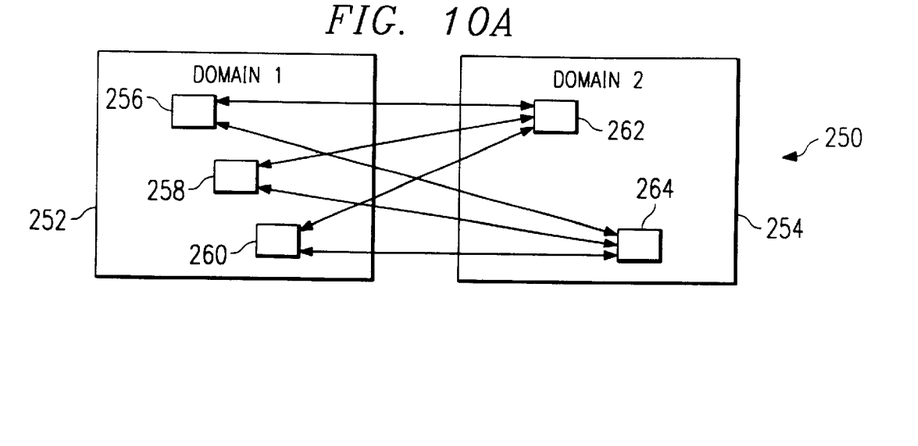
FIGS. 10A and 10B are block diagrams of many-to-many interaction between domains and of simplified domain interaction enabled by the inter-domain connectivity plane according to the present invention.
Figure 10B:
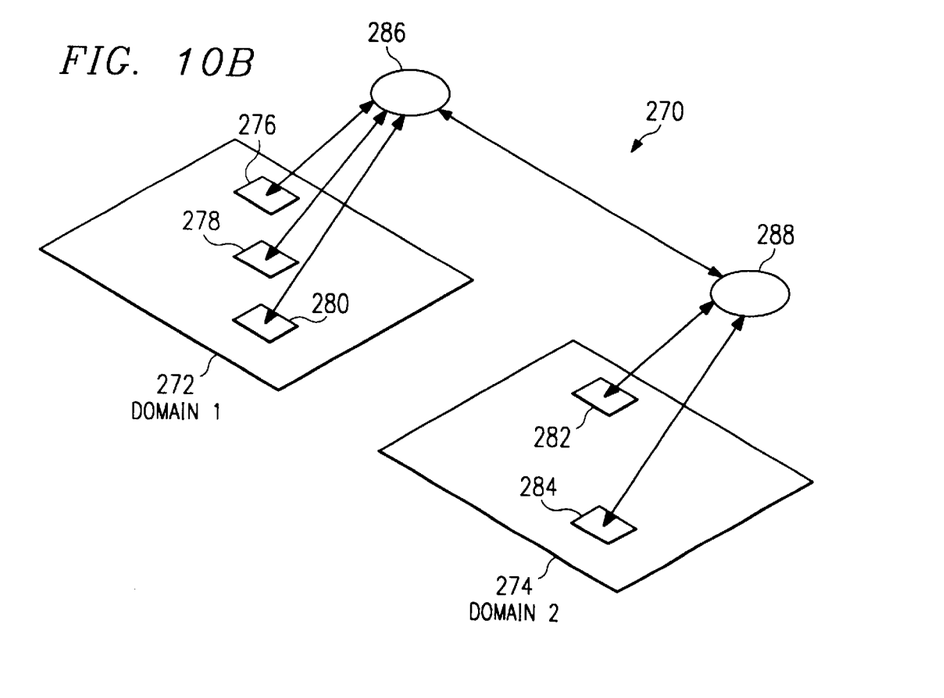

FIG. 10A is a block diagram of many-to-many interaction between domains, and FIG. 10B is a block diagram of simplified domain interaction enabled by the inter-domain connectivity plane according to the present invention. As shown in FIG. 10A, an environment 250 can include a first domain 252 and a second domain 254. Domain 252 can include a number of applications 256, 258 and 260. Similarly, domain 254 can include a number of applications 262 and 264. In the many-to-many scheme of environment 250, applications 256, 258 and 260 of domain 252 must handle data conversions between applications 262 and 264 of domain 254, and vice versa. Further, each application has concerns about security and permissibility, and multiple inter-domain communication channels must be maintained.

FIG. 10B is a block diagram of simplified domain interaction enabled by the inter-domain connectivity plane of the present invention. As shown, an environment 270 can include a first domain 272 and a second domain 274. Domain 272 can include a number of applications 276, 278 and 280, and domain 274 can include applications 282 and 284. As has been described, data and information from domains 272 and 274 can be abstracted and provided to engines 286 and 288. Engines 286 and 288 then interact on the inter-domain connectivity plane thus simplifying the interaction between domain 272 and 274. The inter-domain connectivity plane, upon which various domain engines 286 and 288 can interact, thereby allows multiple, diverse entities (e.g., enterprises, divisions, etc.) to link supply chain operations.

Figure 11:
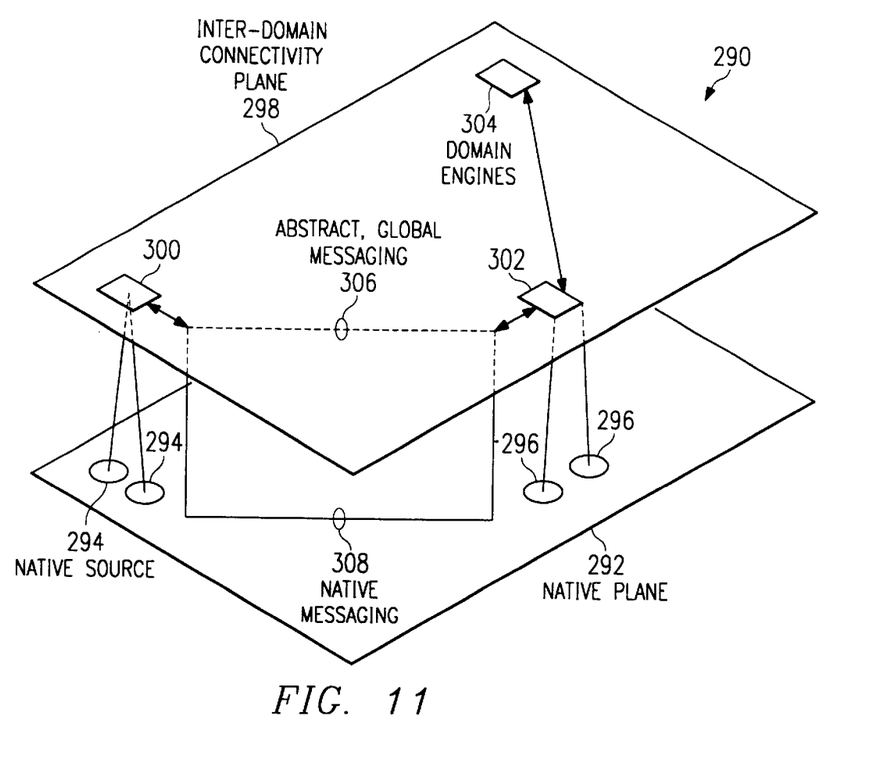
FIG. 11 is a block diagram of one embodiment of an inter-domain connectivity plane according to the present invention.

FIG. 11 is a block diagram of one embodiment of an inter-domain connectivity plane according to the present invention. As shown, an environment 290 includes a native plane 292. Native plane 292 can include native sources 294 associated with a first domain and native sources 296 associated with a second domain. Native sources 294 and 296 can comprise data sources, planning engines and other domain related data and applications. Data and information from native sources 294 and 296 are abstracted onto an inter-domain connectivity plane 298 using various adapters within the universal adapter framework as has been described. For example, business object servers (BOS's) can be used to raise data to inter-domain connectivity plane 298. A domain engine 300 can be associated with the first domain and receives data and information abstracted from native sources 294. In an analogous manner, a domain engine 302 can be associated with the second domain and receives data and information abstracted from native sources 296. Inter-domain connectivity plane 298 can further include one or more domain engines 304 not specifically associated with a domain but operating on inter-domain connectivity plane 298 to provide or perform desired functions. Inter-domain connectivity plane 298 enables global messaging, as represented by line 306, directly between domain engines 300, 302 and 304, as viewed by domain engines 300, 302 and 304. However, the messaging is actually transparently supported by native messaging 308 on native plane 292. Inter-domain connectivity plane 298 provides an abstracted layer to allow harmonization across distributed domains and provides significant advantages by harmonizing such aspects as object structure, messaging paradigm, naming and security.

Figure 12:
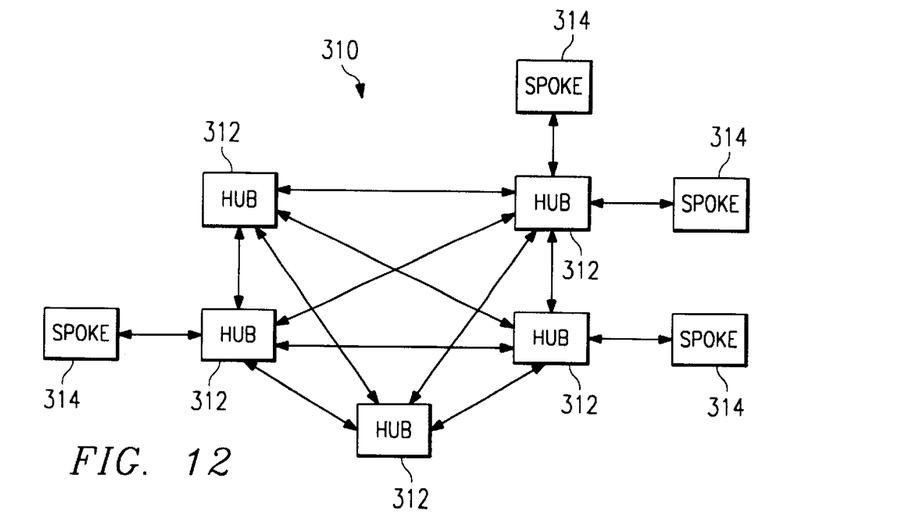
FIG. 12 is a block diagram of a hub and spoke collaboration network formed by engines on the inter-domain connectivity plane.

FIG. 12 is a block diagram of a hub and spoke collaboration network formed by engines on the inter-domain connectivity plane. As shown, an inter-domain connectivity plane 310 can include a plurality of domain engines 312 and 314. In the hub and spoke arrangement, engines 312 and 314 are associated with one of two kinds of domains or entities in the network. As shown, there are hub engines 312 and spoke engines 314. Hub engines 312 can communicate simultaneously with multiple other hub engines 312. Spoke engines 314, on the other hand, only communicate with parent hub engines 312. Additionally, in one implementation, spoke engines 314 do not perform analysis but can only feed information to and be fed information from their parent hub engine 312. In another implementation, spoke engines 314 can be mid tier or web interface tier engines. In this scheme, the mid tier engines can perform some lightweight analysis, and the web interface tier engines do not perform analysis. Thus, the arrangement would enable three forms of communication within inter-domain connectivity plane 310: hub-to-hub, hub-to-spoke and user interface-to-hub.

The inter-domain connectivity plane enables inter-domain visibility, signaling, collaboration, analysis and optimization. Inter-domain visibility is a basic function of the inter-domain connectivity plane and gives visibility into data of other domains. Data can be pushed as well as pulled and can be used for user interaction as well as automatic analysis purposes. Inter-domain signaling allows domains to signal other domains. For example, the inter-domain connectivity plane can enable an early warning system in which a domain can signal other domains when certain conditions arise. The inter-domain connectivity plane also facilitates engine-to-engine collaboration across domains (as opposed to simple person-to-person collaboration). further, the inter-domain connectivity plane can enable inter-domain analysis and optimization in part by enabling the transfer of the model agents described above.

The inter-domain connectivity plane is built upon the core environment and, as such, possesses the attributes and components of the core environment. Of these components, global messaging (used to message between multiple domains) and transactional messaging (used to keep the domains transactionally consistent) is important. Business object servers used to raise objects from the native plane to the inter-domain connectivity plane are also important. The engines on the inter-domain connectivity plane provide the bulk of the function and support numerous functions, including the early warning system, multi-domain collaboration, inter-domain analysis and optimization, a permissibility framework, and global naming. The engines support the model agents which enable partial mirroring of remote models and support publish and subscribe model agent distribution. Security is also a fundamental attribute of the inter-domain connectivity plane. At the lowest level, the inter-domain connectivity plane inherits the security features of the core environment including: user interface to engine security (authentication and encryption) and messaging security (authentication and encryption). At the design level, security is ensured by a combination of permissibility and push technology.

Scaleability is an important aspect, and the inter-domain layer is scaleable in several dimensions. Guaranteed asynchronous messaging increases scaleability by minimizing network dependencies. This can be especially critical as the number of communicating domains increases. Scaleability is also achieved by avoiding the many-to-many problem at the application level (security, permissibility and data conversion). Scaleability is provided by allowing a single domain to talk to multiple other domains with no controlling domain. A domain typically needs to communicate with multiple other domains. However, the inter-domain connectivity plane allows the domains to do so without the need for any sort of higher level controller. Additionally if communications between a pair of domains breaks down, communications can continue between other domains, leading to far greater scaleability.

Global Naming

The inter-domain connectivity plane can implement a global naming scheme that allows entities to be uniquely defined on a global basis. For example, the global naming scheme can comprise a three part naming scheme using the Internet domain name server (DNS) at the highest level, enterprise name services (such as CORBA or LDAP) at the next level, and transient name services at the process level. With respect to naming, both name wrapping and name mapping provide harmonization. The name wrapping allows non-global names to be raised into a global name space and ensures unique naming when data is brought up to the inter-domain connectivity plane. Name mapping, on the other hand, provides a map to ensure that different names for the same object refer to the same object. Name mapping can allow two global names to refer to the same entity by mapping the names to each other.

Although the present invention has been described in detail, it should be understood that various changes, substitutions and alterations can be made hereto without departing from the spirit and scope of the invention as defined by the appended claims.

What is claimed is:

1. A computer implemented system for inter-domain analysis related to a supply chain activity, comprising:
    a first domain engine associated with a first supply chain entity;
    the first domain engine having a first domain model representing a supply chain activity of the first supply chain entity;
    the first domain engine operable to receive a second model agent representing a partial replica of a second domain model, the second domain model representing a supply chain activity of a second supply chain entity; and
    the first domain engine operable to expand the first domain model using the second model agent to accomplish inter-domain analysis related to the supply chain activity at the first domain engine.

2. The system of claim 1, wherein the first domain engine is operable to generate a first model agent that represents a partial replica of the first domain model for use at the second domain engine to accomplish inter-domain analysis related to the supply chain activity at the second domain engine.

3. The system of claim 1, wherein the first domain engine is further operable to accomplish inter-domain optimization related to the supply chain activity at the first domain engine.

4. The system of claim 1, wherein the second model agent is pushed to the first domain engine by the second domain engine.

5. The system of claim 1, wherein the first domain engine pulls the second model agent from the second domain engine.

6. The system of claim 1, wherein the second model agent comprises a data model agent that can transfer data only.

7. The system of claim 1, wherein the second model agent comprises an object model agent that can transfer data and graphs of objects.

8. The system of claim 1, wherein the second model agent comprises a behavior model agent that can transfer data, graphs of objects, and behavior.

9. The system of claim 1, wherein the first domain engine is further operable to expand the first domain model using model agents generated at a plurality of other domain engines to accomplish inter-domain supply chain analysis at the first domain engine.

10. The system of claim 9, wherein the first domain engine is further operable to accomplish inter-domain supply chain optimization.

11. A computer implemented process for inter-domain analysis related to a supply chain activity, comprising:

providing a first domain model representing a supply chain activity of a first supply chain entity;

receiving a second model agent representing a partial replica of a second domain model, the second domain model representing a supply chain activity of a second supply chain entity;

expanding the first domain model using the second model agent; and performing inter-domain analysis related to the supply chain activity at a first domain engine using the expanded first domain model.

12. The process of claim 11, wherein performing further comprises performing inter-domain optimization related to the supply chain activity at the first domain engine.

13. The process of claim 11, wherein:

expanding is accomplished by the first domain engine; and the second model agent is pushed to the first domain engine from a second domain engine.

14. The process of claim 11, wherein:

expanding is accomplished by the first domain engine; and the second model agent is pulled to the first domain engine from a second domain engine.

15. The process of claim 11, wherein the second model agent comprises a data model agent that can transfer data only.

16. The process of claim 11, wherein the second model agent comprises an object model agent that can transfer data and graphs of objects.

17. The process of claim 11, wherein the second model agent comprises a behavior model agent that can transfer data, graphs of objects, and behavior.

18. The process of claim 11, further comprising:

receiving model agents from a plurality of domain engines, the domain engines associated with entities in a supply chain; and expanding the first domain model using the model agents; and performing inter-domain supply chain analysis at the first domain engine using the model agents.

19. The process of claim 18, wherein performing further comprises performing inter-domain supply chain optimization at the first domain engine.

* * * * *